(12) United States Patent
Eliyahu

(10) Patent No.: US 9,690,743 B2
(45) Date of Patent: Jun. 27, 2017

(54) COMPUTER INTERFACE EXTENDER APPARATUS

(71) Applicant: Nexark, Inc., Los Angeles, CA (US)

(72) Inventor: Menachem Eliyahu, Los Angeles, CA (US)

(73) Assignee: NEXARK, INC., Los Angeles, CA (US)

( * ) Notice: Subject to any disclaimer, the term of this patent is extended or adjusted under 35 U.S.C. 154(b) by 0 days.

(21) Appl. No.: 14/817,994

(22) Filed: Aug. 4, 2015

(65) Prior Publication Data

US 2017/0039158 A1 Feb. 9, 2017

(51) Int. Cl.
*G06F 1/16* (2006.01)
*G06F 13/40* (2006.01)

(52) U.S. Cl.
CPC ...... *G06F 13/4068* (2013.01); *G06F 13/4081* (2013.01)

(58) Field of Classification Search
CPC .............. G06F 19/3462; G06F 13/409; G06F 2213/0042; G06F 13/4022; G06F 13/4027; G06F 13/4045; G06F 1/1632; G06F 1/187; G06F 13/4068; G06F 13/4081
USPC ............ 361/679.41, 679.01, 679.43, 679.45, 361/679.4, 679.31
See application file for complete search history.

(56) References Cited

U.S. PATENT DOCUMENTS

2015/0022966 A1* 1/2015 Chen .................... H01R 25/006
361/679.41

* cited by examiner

*Primary Examiner* — Anthony Haughton
*Assistant Examiner* — Ingrid Wright
(74) *Attorney, Agent, or Firm* — Leason Ellis LLP

(57) ABSTRACT

The present invention concerns an apparatus to extend a computer interface from a user inaccessible location to a user accessible location. Specifically, the apparatus of the present invention is configured to provide at least one computer port in an easily accessible location that is connected, via an adaptor, to a computer port integrated into a computer. The computer interface extender includes a hardware interface portion having a primary computer interface port, e.g., a USB port, that incorporates at least a first bidirectional electrical conduit and is configured to couple to a port located within a computer housing. The apparatus also includes a user interface portion having at least one, and preferably four, secondary computer interface ports, e.g., USB port, equipped with secondary bidirectional electrical conduit. Connecting the hardware and user interface portions is an extension member with a conduit bridge connecting the first and second bidirectional electrical conduits. The hardware and user interface portions fasten the interface extender apparatus to the computer housing.

15 Claims, 8 Drawing Sheets

COMPUTER INTERFACE EXTENDER APPARATUS

FIELD OF THE INVENTION

The present invention relates to an apparatus for extending and expanding a computer interface connection to improve ease of use and access.

BACKGROUND OF THE INVENTION

The number of electronic devices that can be connected to a computer through a universal interface, such as USB, increases every year. These devices, such as tablet computers, keypads, input devices, smart phones, storage devices, media players, health trackers, watches, navigation systems, and other devices utilize computer interfaces to exchange information with a computer and the world at large.

However, the number of connection ports integrated into computer housings has not kept pace with the number of devices a user might wish to simultaneously connect with a computer. As such, there is a need for port extenders and expanders that increase the number of computer interface ports. Such port expanders, or hubs, are usually third party devices that bear little resemblance to the industrial design of the original computer. Such hubs are usually placed on the desktop and are positioned to allow access to the ports. However, placement on a desktop or work surface reduces work space and increases clutter. One solution is to hide the expansion ports on the rear of the computer housing. However, hiding the interface extenders makes it difficult to quickly change the devices plugged into the interface ports. Therefore, what is needed is an apparatus that provides additional computer interface ports, but also frees up workspace and allows ease of access for directly interfacing with the expansion ports.

A recent solution to some of the problems of the prior art can be found in US Patent Application Publication US 2015/0022966 A1 of Chen. This publication discloses a 1 to 4 USB expander which converts one rear USB port for an iMax all-in-one computer. However, it does not fit other computer arrangements. Also, it connects to the iMax monitor by means of a positioning slot into which the lower edge of the monitor must fit. Further, while it has a solid body, in order to flex it into engagement with the monitor it requires a bending slot. Finally, the USB terminal that fits into the rear monitor terminal must be offset.

Thus, it would be advantageous if a solid body USB extender were provided with had a simpler construction and could be attached to a wider variety of monitors or computer housings.

SUMMARY OF THE INVENTION

In accordance with a broad aspect of the present invention, a computer interface apparatus is provided for positioning a plurality of computer interface ports in an easily accessible location relative to the user. In a particular embodiment of the present invention, the computer interface apparatus comprises a hardware interface portion having a primary computer interface incorporating at least a first bidirectional electrical terminal providing bi-directional transmission of electrical signals and configured to couple to a computer interface port located within a computer housing. The computer interface apparatus also includes a user interface portion having at least one secondary computer interface port in which there is located at least one secondary computer terminal equipped with at least one secondary bidirectional electrical conduit. The user interface portion and the hardware interface portion are connected by an extension member or extender portion. The extender portion incorporates a conduit bridge, which may include a multiplexer/de-multiplexer circuit to avoid signal collisions and a protocol conversion circuit so different types of terminals can be used. The extender portion electrically connects the primary and secondary electrical conduits.

In one embodiment the primary and secondary computer interface ports are USB ports. In addition, the primary interface port is configured as a male USB port to connect to a female USB port on the rear of a monitor, such as the USB port on the rear of an Apple iMac monitor. The secondary interface port may be two or more female USB ports. The extender portion is such that when the primary interface port is connected to the rear USB port of the iMac monitor, the secondary interface ports are positioned below the lower edge of the monitor and face forward in the direction of the user. Thus, the two or more female USB ports are easily accessed by the computer user.

Knobs or grippers are located on the portion of the interface apparatus housing that contains the two female USB ports. When the primary interface of the apparatus is positioned in the rear USB port and rotated forward, the knobs or grippers engage the bottom and/or front surface of the monitor and snap the apparatus into engagement with the monitor. As a result, a USB cable can be inserted into one of the two front facing USB female interface ports and the apparatus is held in place.

The upper surface of user interface portion is planar, and thus is simple to manufacture. In particular it has no connection or bending grooves. The extension portion can be made to slop backwardly so that the USB terminal can be at a right angle to the extension portion and still enter the terminal on the monitor. Further, the extension portion can have a telescoping section so it can be adjusted to fit different size monitors or computer housings.

BRIEF DESCRIPTION OF THE DRAWINGS

The foregoing and other features of the present invention will be more readily apparent from the following detailed description and drawings of exemplary embodiments of the invention where.

DETAILED DESCRIPTION OF CERTAIN EMBODIMENTS OF THE INVENTION

By way of overview and introduction, the present invention concerns an apparatus to extend a computer interface from a user inaccessible location to a user accessible location. Specifically, the apparatus of the present invention is configured to provide at least one computer port in an easily accessible location that is connected, via an adaptor, to a computer port integrated into a computer.

According to the present invention, a computer interface apparatus 100 is configured to communicatively couple to an interface port located on or within a computer housing 101. In the illustrated configuration, the computer is an integrated monitor and CPU unit with computer interface ports located in a rear portion of the computer/monitor housing, e.g., the computer/monitor housing of an iMac all-in-one computer. The apparatus is used so as to replicate the interface port in the rear of the monitor in a new location and/or add additional interface ports.

With reference to the illustration provided in FIG. 1, the apparatus 100 of the present invention is configured to couple to a computer interface, e.g., a USB port, located within the back of computer housing 101. As shown, the computer is an integrated monitor and computer housing device. However, in alternative arrangements, the computer housing 101 can be a standard computer monitor, multiple monitors, laptops, desktops, workstations, personal digital assistants, servers, blade servers, mainframes, and other appropriate computers or other known and understood computer form factors.

Figure 2A:
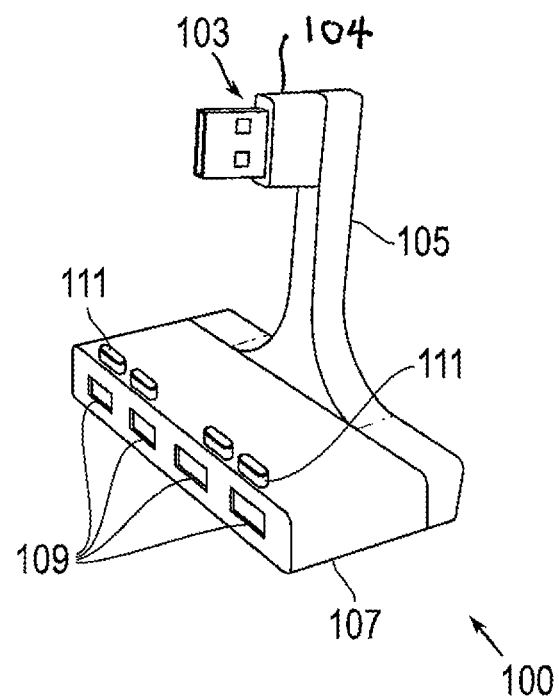
FIG. 2A is a perspective view of the computer interface apparatus of the present invention in a unitary form or in a retracted position.

FIG. 2A provides a more detailed view of the computer interface apparatus or extender 100. The computer interface apparatus 100 has a hardware interface portion 103 configured to interface with a computer port. In one preferred embodiment, the computer port is a USB-A/B/C port that transmits both data and electrical energy bi-directionally to a peripheral. However, in an alternative context, hardware interface portion 103 is a HDMI, DVI, DisplayPort, Thunderbolt, FireWire 800, FireWire 400, power, Ethernet, stereo audio or other type of connector that allows the interface apparatus or extender 100 to connect with the computer 101. In the illustrated arrangement, the hardware interface portion 103 is equipped with a "male" style interface port 104. It should be appreciated that the interface port 104 connection type used by the hardware interface portion 103 can be either "male" or "female." In a further arrangement, the hardware interface portion 103 is removable or configurable based on the connection configuration of the computer interface. By way of non-limiting example, the hardware interface portion 103 is equipped with a removable adaptor (not shown) that changes the interface from male to female, or vice versa, depending on the computer hardware interface encountered.

Figures 1A, 1B:
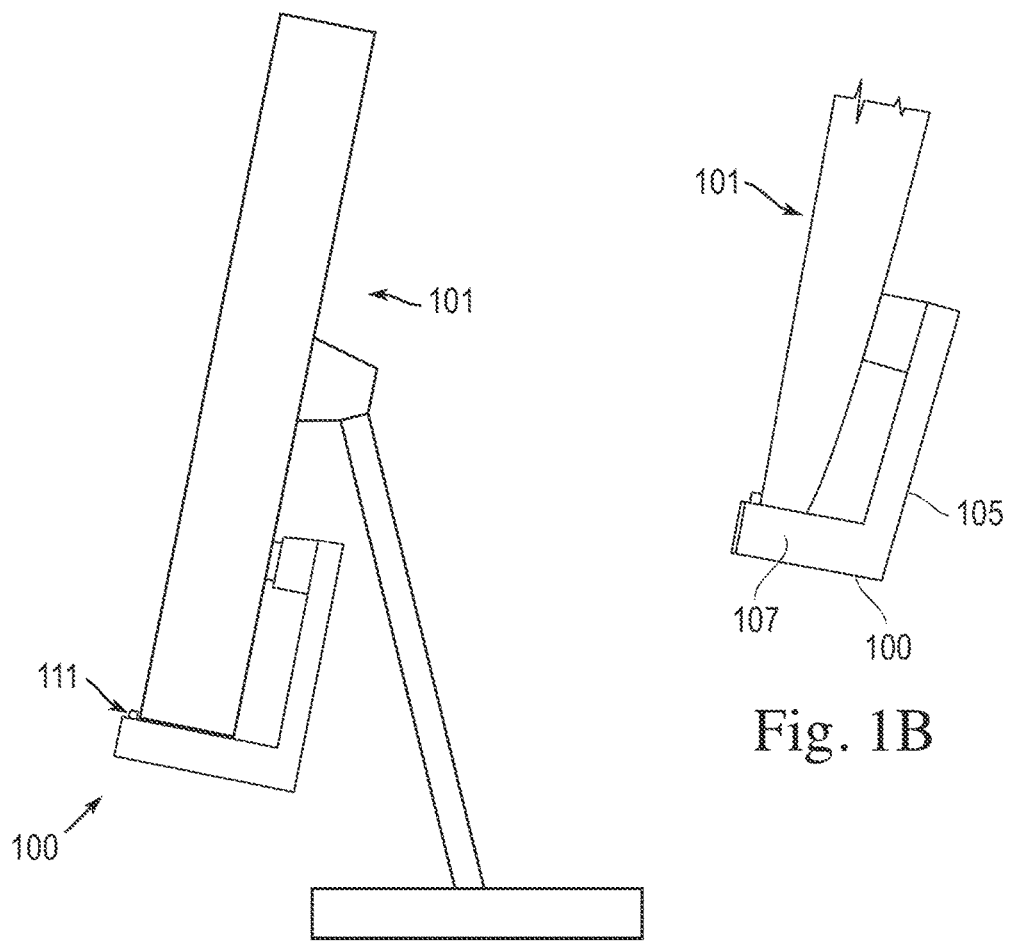
FIG. 1A is a side view of the computer interface apparatus of the present invention interfaced with a computer monitor housing and FIG. 1B is an enlarged view showing the apparatus interfaced with a computer monitor having a sloped back.
Figure 2B:
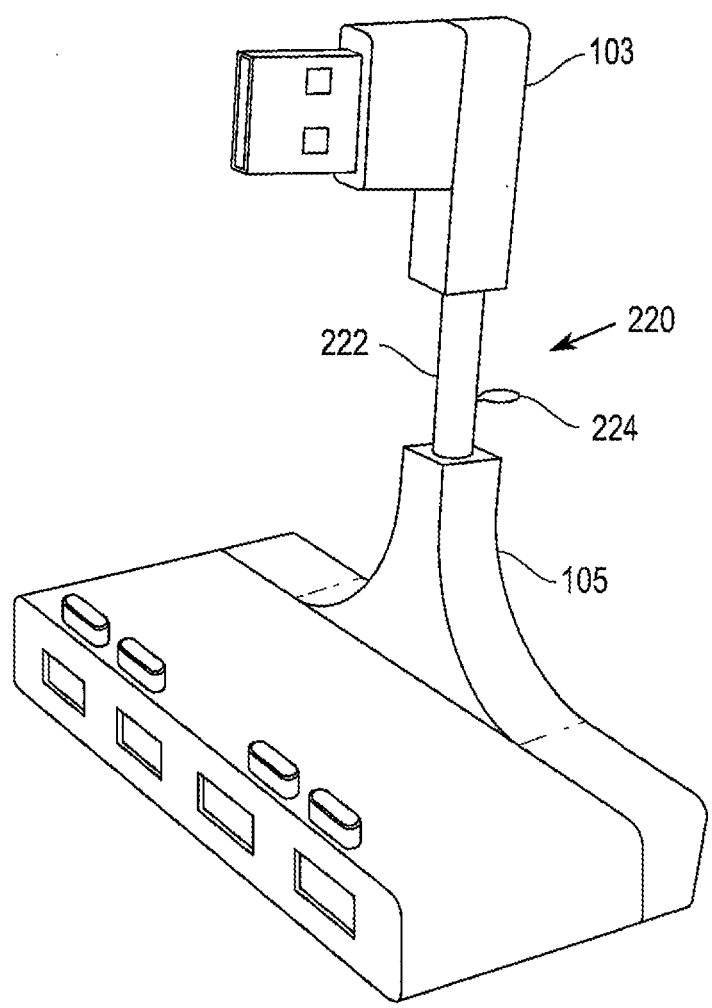
FIG. 2B is a perspective view of the computer interface apparatus of the present invention in an extended position.

The hardware interface portion 103 with its interface port 104 as shown in FIG. 2A is integral with or connected at a right angle to the axis of an extender portion 105. Similarly the user interface portion 107 with its interface ports 109 as shown in FIG. 2A is integral with or connected at a right angle to the axis of the extender portion 105. As shown in FIG. 1A the housing has a flat back so the interface portion 103 can slide directly into the computer terminal. If the back is sloped as shown in FIG. 1B, the extender portion 105 can be at an angle to the user interface portion 107 so that the interface can still slide directly into the computer terminal and does not have to be offset at some angle other than a right angle. In FIG. 2A both portions 103 and 107 extend from extender portion 105 in the same direction, but depending on the circumstances they could extend in different directions. In a particular arrangement, the extender portion 105 is a uniform material connection that encloses any electrical and/or data connections between the hardware interface portion 103 and the user interface portion 107. In another arrangement in FIG. 2B, the extender portion 105 is configured to expand or contract based on user selection. For example, the extender portion 105 may include a rail or guide system 220 that allows an inner portion 222 to extend beyond the outer portion such that the total length of the extender portion 105 can be increased as shown in FIG. 2B or decreased. In this way the extender portion 105 is configured to expand in at least one direction from a first length to a second length. In addition, the guide system is equipped with an arresting device 224 to arrest the expansion of the extender portion 105 to a pre-determined length between the first length and the second length.

With this configuration the wires and other data/power conduits incorporated into the extender portion 105 are likewise configured to extend or contract in length. In a configuration in which extension elements are used, spools, take up wheels, or other mechanisms are used to collect or extend wires located within the extender portion 105.

As provided in FIGS. 2A and 2B, the extender portion 105 is connected to the user interface portion 107. In one arrangement, the user interface portion 107 is permanently affixed to the extender portion 105. In an alternative arrangement, the user interface portion 107 is removably connected to the extender portion 105. In a further arrangement, the user interface portion 107 is connected to the extender portion 105 though a gimbal, hinge, or other mechanism (not shown) that provides a degree of movement in the positioning of the extender portion 105 relative to the user interface portion 107.

The user interface portion 107 is equipped with at least one replicated computer port 109. In the illustrated arrangement, the replicated computer ports 109 are the same port style as the port integral to the computer housing of the hardware interface portion 103. As a non-limiting example, the interface port 103 includes a male USB interface, and replicated computer ports 109 are female USB ports. However, in an alternative configuration, at least a portion of the replicated computer ports 109 are of the same interface type as the hardware interface portion 103 or are of different type, e.g., mini or micro USB ports or Ethernet ports. In the provided arrangement, the replicated computer ports 109 are powered by the connection to the computer 101 and mediated through linkages between the user interface portion 107 and the hardware interface portion 103. In a particular embodiment, the user interface portion 107 is further equipped with a power interface for separately providing power via a power line adaptor or power supply, to the device connected to the ports 109. Also, a multiplexer/demultiplexer circuit may be provided to avoid signal collisions and a protocol conversion circuit may be provided so different types of terminals can be used.

As shown in FIGS. 1 and 2, the user interface portion 107 is further equipped with arrestors 111 in the form of projecting knobs or grippers. In one particular arrangement, the arrestors 111 prevent the movement of the apparatus 100 when the hardware interface 103 is coupled to a hardware port of the computer 101. For example, the arrestors form a clip that abuts front surface of the computer housing and prevents the user interface portion 107 from moving in response to a connector being coupled to one of the replicated computer ports 109.

In an alternative arrangement, the arresters 111 are spring loaded and retract into the user interface 107, when the port extension apparatus 100 is coupled to the computer housing 101. Here, the arresters 111 are able to push against a surface of the computer 101 such that tension is maintained between the apparatus 100 and the computer 101. With spring loaded arresters the apparatus 100 can be slid into place so that the hardware interface portion connects to the port of the computer. When it reaches its position the arresters have cleared the front of the computer monitor housing and can pop-up in front to hold the apparatus stably on the monitor.

As a further alternative, in addition to or in place of the projecting knobs or grippers 111, the interface extender apparatus can be secured to the computer housing by some other type of arresting device, e.g., a magnet, a suction device, or a material having a high coefficient of friction relative to the computer housing. Certain monitors or computer housings, e.g., the iMax, have recesses in the bottom of their housings into which the projections 111 can extend to hold the device securely in place. In this arrangement, rather than the user portion of the device extending a little beyond the front surface of the monitor as shown in FIG. 1, it is flush with the front surface. These would be located between the upper surface of the user interface portion and the lower edge of the housing 101.

Figure 3:
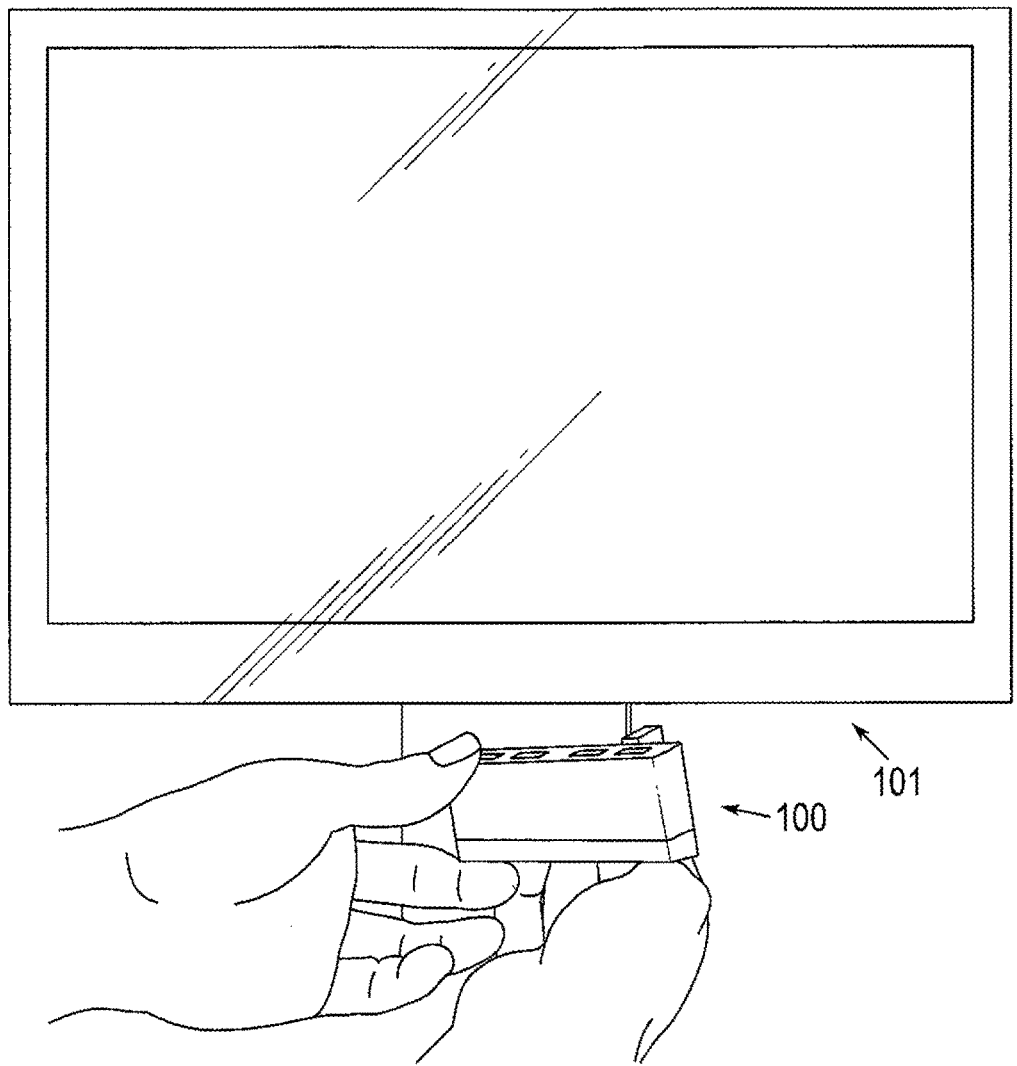
FIG. 3 is a front view of the computer interface apparatus according to an embodiment of the present invention during a securing step.

FIGS. 3-6 present a series of depictions of one embodiment of the present invention being assembled onto a computer housing. FIG. 3 demonstrates positioning the computer interface extender 100 so that it can be secured to a computer housing 101. In the depicted arrangement the computer interface extender 100 is positioned under the computer housing 101. It should be understood that the computer interface extender 100 can be placed in alternative locations, such as the side or top of the computer housing 101, depending on the specific configuration of the computer housing 101 and the extender portion 105.

Figure 4:
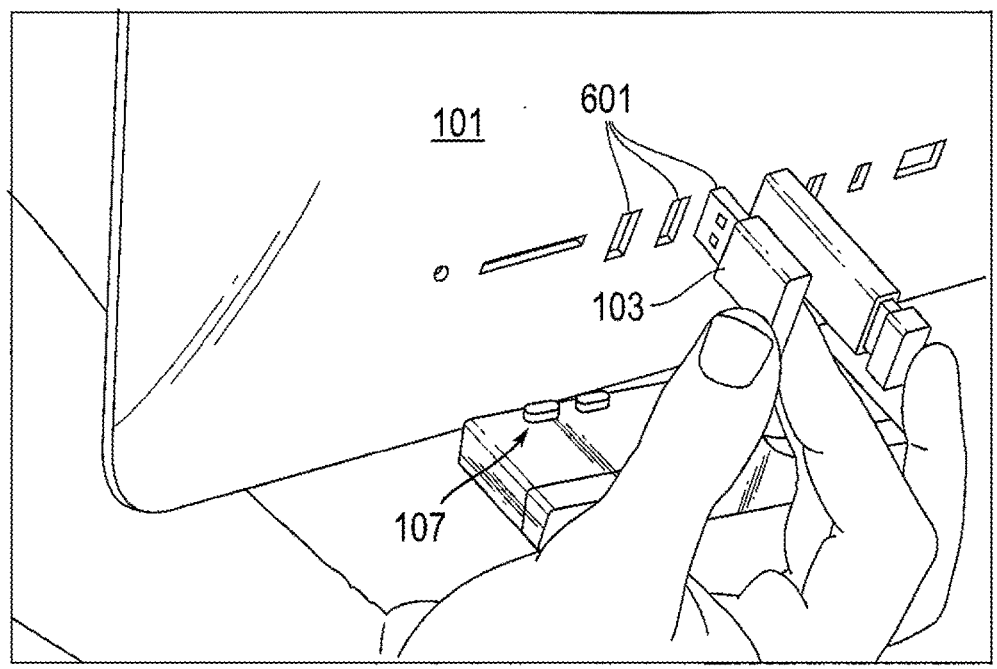
FIG. 4 is a rear view of the computer interface apparatus according to an embodiment of the present invention during the securing step.

As shown in FIG. 4, securing the computer interface extender 100 to the computer housing 101 includes inserting the hardware interface portion 103 into a computer interface 601. Thus, a link between the hardware interface portion 103 and the computer 101 is established.

Figure 5:
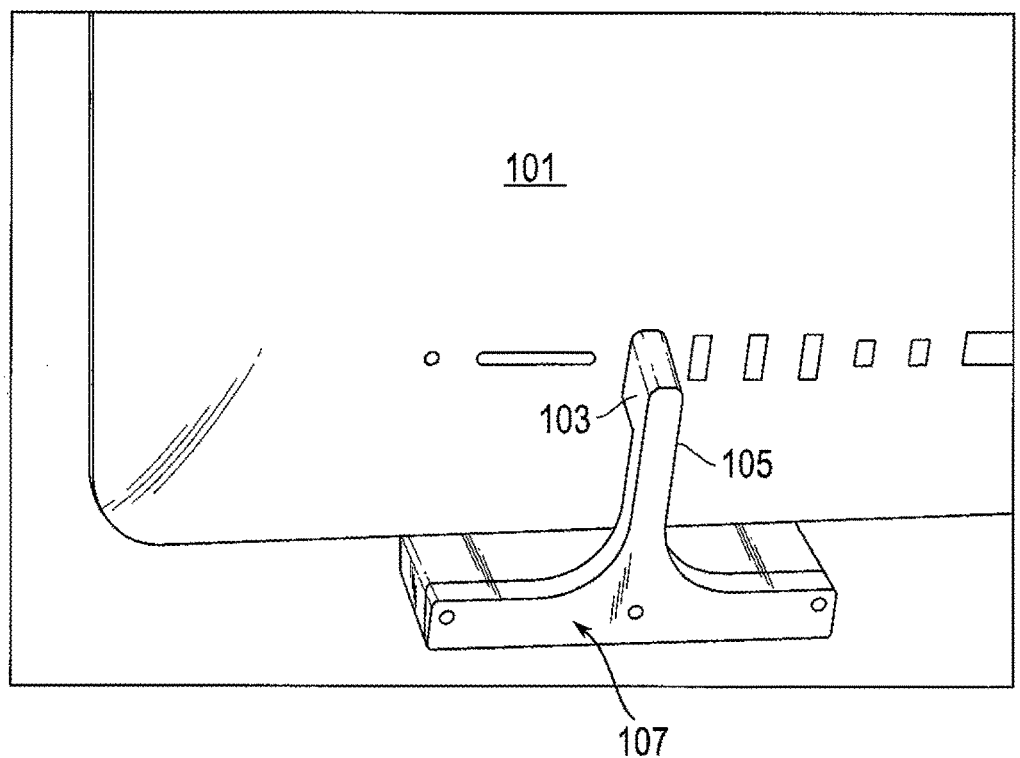
FIG. 5 is a rear view of the computer interface apparatus completely coupled to the computer monitor housing according to an embodiment of the present invention.
Figure 6:
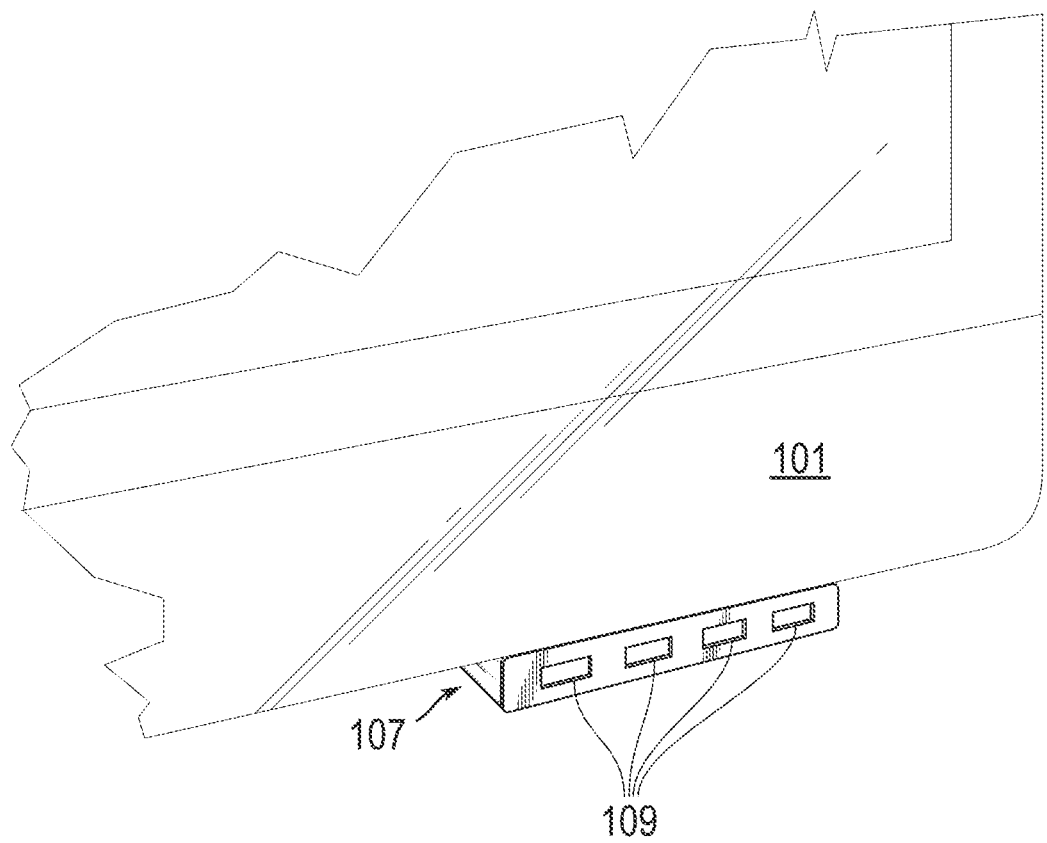
FIG. 6 is a front view of the computer interface apparatus of the present invention secured to a computer monitor housing.
Figure 7:
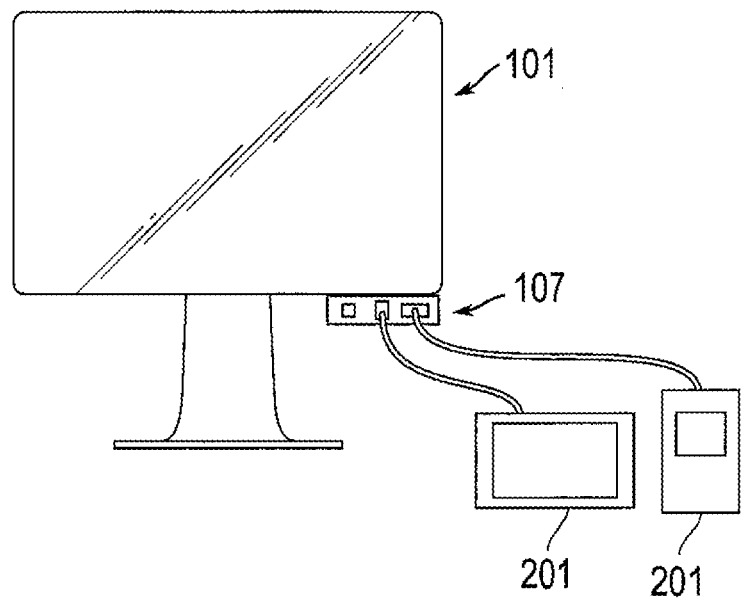
FIG. 7 is a front view of the computer interface apparatus coupled to a computer monitor housing according to an embodiment of the present invention with electronic devices connected to the apparatus.

Next, the user interface portion is adjusted into place such that the interface ports 109 are presented to a user for use in connecting devices. This may be achieved by flexing the user interface portion of the apparatus or rotating the apparatus so that the arresters 111 snap up in front of the housing 101. The result from the rear is shown in FIG. 5. In the depicted arrangement of FIGS. 5-7, the user interface portion 107 abuts the bottom of the computer housing 101. FIGS. 6 and 7 show that the interface to the computer, which was only one port in the back of the housing, has been converted by the present invention into four ports that are accessible from the front.

FIG. 7 illustrates the apparatus of the present invention secured to the housing of the computer 101. In the provided front view, the user interface portion 107 of the apparatus 100 is provided. In a further arrangement, the user interface portion 107 is shown being attached, e.g., by USB cables, to various devices 201 to facilitate or orchestrate the transmission of data to and from the computer 101 and the various devices 201 connected to the connector ports 109. If desired, the apparatus 100 can also equipped with a processor and/or other electronic or electrical components to further control the connections.

As shown, the user interface portion 107 provides access ports 109 for the connection of devices to the computer without need to access the rear of the computer 101. More importantly, the configuration of the user interface portion 107 is such that it is secured to the bottom the computer interface, and provides an unobstructed location for connecting the various devices.

Figure 8:
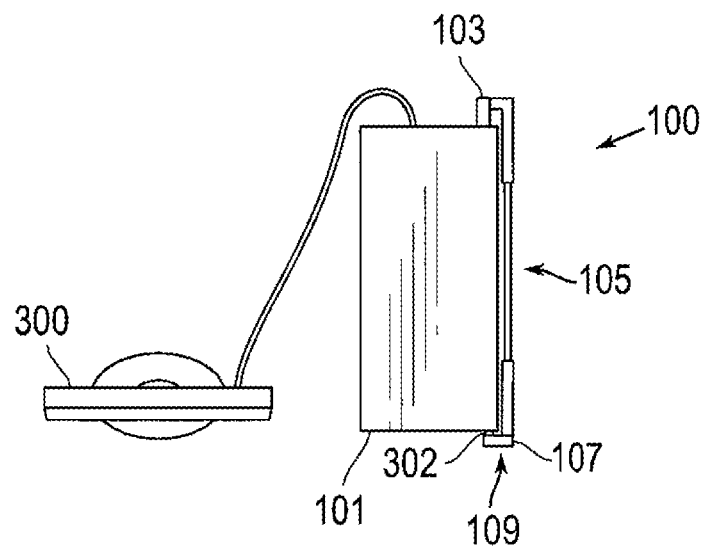
FIG. 8 is a top view of the computer interface apparatus of the present invention secured to a computer housing in an alternative embodiment of the present invention.

Turning to an alternative configuration, FIG. 8 illustrates a top view of an embodiment of the computer port extender 100' coupled to a computer tower or work station 101 that utilizes a separate or independent monitor or display 300. In the illustrated configuration the computer interface apparatus 100' is secured by coupling the hardware interface portion 103 to a computer port located on the rear of the computer housing 101. The extender portion 105 is configured to span the depth of the housing 101 so as to present replicated computer ports 109 to the user at the front of the housing. As shown in FIG. 2B, the extender portion may telescope so as to fit various computer housings. In a further arrangement, the user interface portion 107 is equipped with retaining elements 302, e.g., manually tightened clamps, to provide additional means for securing the user interface to the computer housing 101. In particular, the retaining elements 302 are used to prevent the movement of the user interface 100' while the connectors of peripheral devices are inserted into and withdrawn from the ports 109.

It should be understood that various combinations, alternatives and modifications of the present invention could be devised by those skilled in the art. The present invention is intended to embrace all such alternatives, modifications and variances that fall within the scope of the appended claims.

The terminology used herein is for the purpose of describing particular embodiments only and is not intended to be limiting of the invention. As used herein, the singular forms "a", "an" and "the" are intended to include the plural forms as well, unless the context clearly indicates otherwise.

It should be noted that use of ordinal terms such as "first," "second," "third," etc., or primary and secondary in the specification or claims to modify an element does not by itself connote any priority, precedence, or order of one element over another or the temporal order in which acts of a method are performed, but are used merely as labels to distinguish one element having a certain name from another element having the same name (but for use of the ordinal term).

The above-description of embodiments of the present invention are not intended to be exhaustive or to limit the systems and methods described to the precise form disclosed. While specific embodiments of, and examples for, the apparatus are described herein for illustrative purposes, various equivalent modifications are possible within the scope of other articles and methods, as those skilled in the relevant art will recognize. The teachings of articles and methods provided herein can be applied to other devices and arrangements, not only for the apparatus and methods described above.

The elements and acts of the various embodiments described above can be combined to provide further embodiments. These and other changes can be made to the system and methods in light of the above detailed description. While the invention has been particularly shown and described herein, with reference to preferred embodiments thereof, it will be understood by those skilled in the art that various changes in form and details may be made therein without departing from the spirit and scope of the invention.

What is claimed:

1. A computer interface extender apparatus configured for mounting to a computer housing, the computer interface extender comprising:
   a hardware interface portion having a primary computer interface port incorporating at least a first bidirectional electrical conduit for the bi-directional transmission of electrical signals, the hardware interface portion configured to couple to a computer interface port located within a computer housing;
   a user interface portion having at least one secondary computer interface port equipped with at least one secondary bidirectional electrical conduit, said user interface portion having a planar upper surface without recesses and which fits against an edge of the computer housing;
   an extension member configured to connect the first and second bidirectional electrical conduits; and
   arrestors on the upper surface of the interface portion;
   whereby the hardware interface portion and the user interface fasten the interface extender apparatus to the computer housing using the arrestors with the hardware interface to fasten the interface extender apparatus to the computer housing.

2. The computer interface extender apparatus of claim 1 wherein the arrestors are projections from the upper surface of the user interface portion that engage the front part of the housing when the interface extender apparatus is installed on the housing.

3. The computer interface extender apparatus of claim 1 wherein the arrestors are projections from an upper surface of the user interface portion that engage recesses in a bottom surface of the housing when the interface extender apparatus is installed on the housing.

4. The computer interface extender apparatus of claim 3, wherein the extension member is configured with an arresting device to arrest the expansion of the extension member to a pre-determined length between the first length and the second length.

5. The computer interface extender apparatus of claim 4 wherein the hardware interface portion and the user interface portion are rigid and are attached to the rigid extension member at a right angle to its axis so as to extend in the same direction from the axis.

6. The computer interface extender apparatus of claim 5 wherein the primary interface port and the secondary interface port are USB terminals.

7. The computer interface extender apparatus of claim 4 wherein the hardware interface portion and the user interface portion are rigid and are attached to the rigid extension member, and
   wherein for a computer housing with a sloped back, the extension member has a corresponding slope and the hardware interface portion is attached to the extension member at a right angle to its axis.

8. The computer interface extender apparatus of claim 1, wherein the extension member is configured to expand in at least one direction from a first length to a second length.

9. The computer interface extender apparatus of claim 1 wherein the extension member is rigid.

10. The computer interface extender apparatus of claim 1, wherein the primary computer interface port is the same type of computer port as the secondary computer interface port.

11. The computer interface extender apparatus of claim 1, wherein the user interface portion is further equipped with control circuity to control communication of electrical signals between the plurality of secondary computer interface ports and the primary computer interface port.

12. The computer interface extender apparatus of claim 11, wherein the movement arresting device is one of a magnet, a suction device, or a material having a high coefficient of friction relative to the computer housing.

13. The computer interface extender apparatus of claim 1, wherein the user interface portion includes a power conduit for receiving power from an external source.

14. The computer interface extender apparatus of claim 1, wherein the user interface portion includes at least one projection that acts to secure the extender apparatus from arresting device.

15. The computer interface extender apparatus of claim 1 wherein the primary interface port and the secondary interface port are USB terminals.

* * * * *